April 2, 1929.     E. F. WAGNER     1,707,241

FLUID PRESSURE BRAKE

Filed June 4, 1927     2 Sheets-Sheet 1

INVENTOR
ERNEST FELIX WAGNER
BY Wm. M. Cady
ATTORNEY

April 2, 1929.    E. F. WAGNER    1,707,241
FLUID PRESSURE BRAKE
Filed June 4, 1927    2 Sheets-Sheet 2

INVENTOR
ERNEST FELIX WAGNER
BY Wm. M. Cady
ATTORNEY

Patented Apr. 2, 1929.

1,707,241

UNITED STATES PATENT OFFICE.

ERNEST FELIX WAGNER, OF PARIS, FRANCE, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 4, 1927, Serial No. 196,480, and in France June 11, 1926.

This invention relates to fluid pressure braking apparatus for railway and the like vehicles and has for its main object to provide improved apparatus of this character which shall automatically ensure the safety of vehicles when descending steep and long gradients.

When braking, during the descent of steep and long gradients, it is necessary for the driver of a train to apply and release the brakes alternately in a systematic manner in order to maintain a sufficient supply of fluid under pressure in the auxiliary reservoirs of the braking apparatus.

It would however be of advantage automatically to control the alternate application and release of the brakes, whilst permitting the driver of the train to graduate the braking effort exerted at will, according to the nature of the train, variations in the gradient and in the resistance offered by the track, and even wholly to supersede the automatic control of the brakes by actuating the driver's brake valve.

Accordingly the invention has for one of its objects to provide arrangements adapted automatically to initiate an alternate application and release of the brakes, as soon as the train attains a predetermined speed, and to maintain such an automatic application and release of the brakes until the speed of the train is reduced to a value lower than that of the predetermined speed. A further object of the invention is to provide arrangements for effecting an automatic emergency application of the brakes if the speed of the train increases, in spite of the alternate application and release of the brakes, to a predetermined maximum speed.

The improved automatic braking apparatus may be controlled mechanically or electrically and is so arranged that the driver can at any time supersede the automatic application of the brakes by actuating the driver's brake valve device.

The invention will now be described by way of example with reference to the accompanying diagrammatic drawings in which:—

Figure 1:
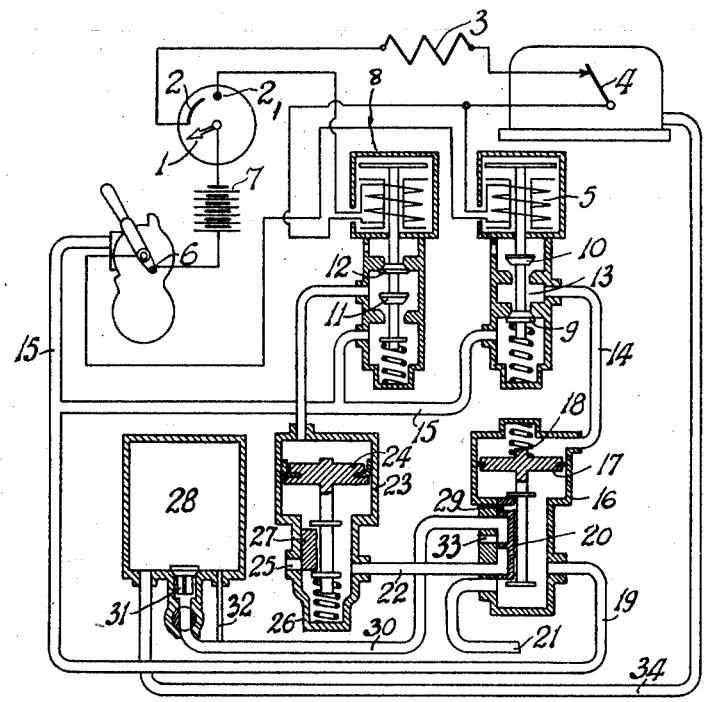
Figure 3:
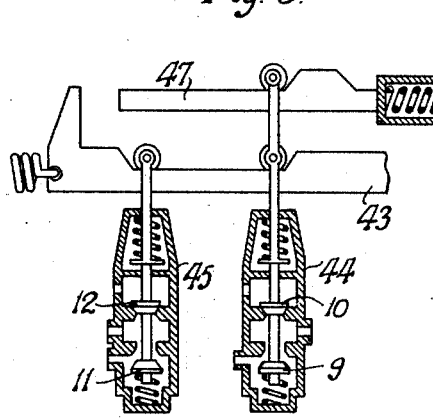
Figure 4:
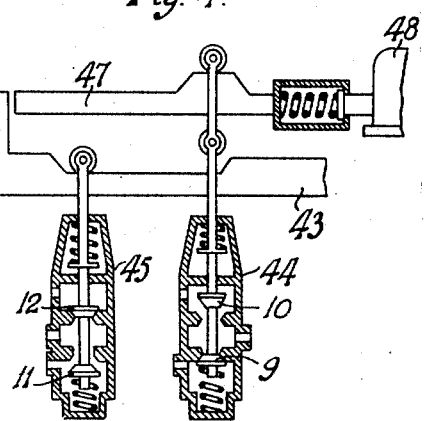
Figure 2:
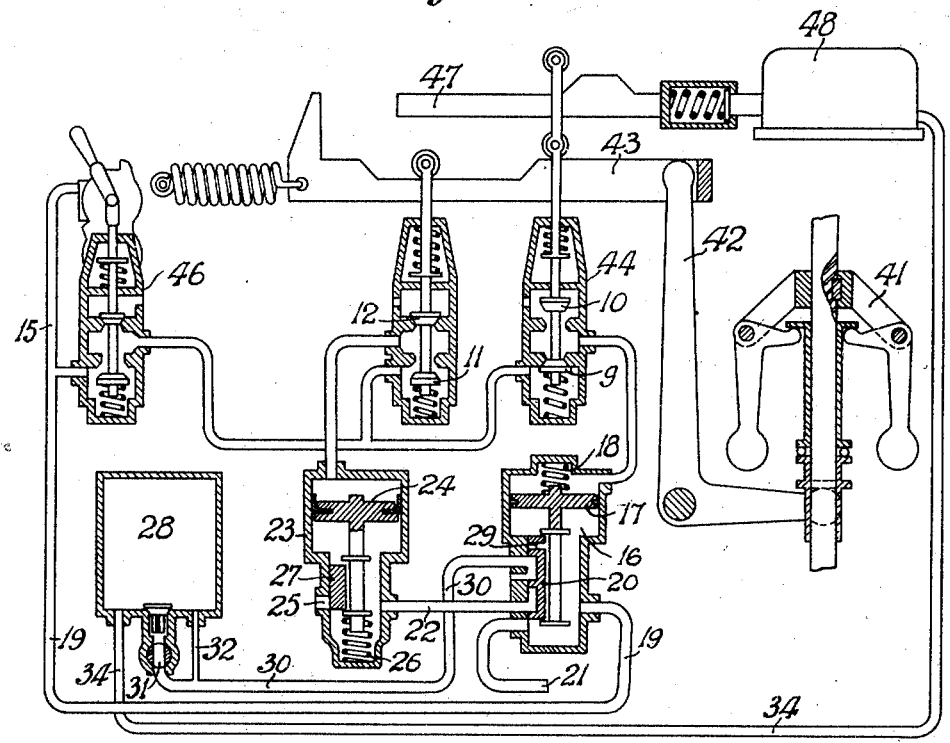
Figure 5:
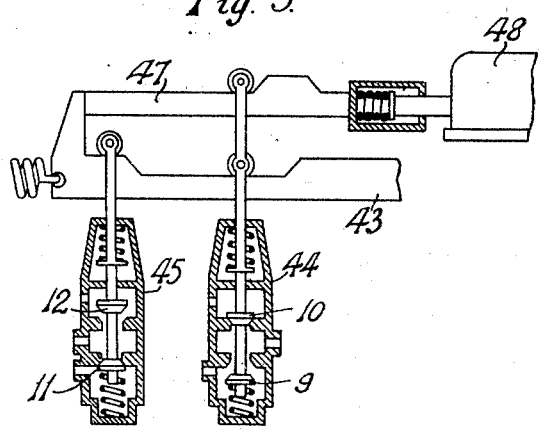

Figure 1 is a view of a constructional form of the improved braking apparatus which is adapted to be controlled electrically, and Figure 2 is a view of a similar constructional form of the improved braking apparatus which is adapted to be controlled mechanically, Figures 3, 4 and 5 being views of a portion of the apparatus illustrated in Figure 2 at different stages during braking. Referring first to Figure 1, it will be observed that a speed indication needle 1, is adapted, to co-operate with a contact 2, and control a circuit through a resistance 3, an automatic contact device 4, adapted to be closed, as illustrated in Figure 1, when the pressure in a reservoir 28 operatively connected therewith descends below a predetermined value, an electro-magnetic valve device 5 comprising poppet valves 9 and 10, a contact 6 arranged to be closed in the running position of the driver's brake valve device and a battery 7. The needle 1 also cooperates with a contact $2_1$ and controls a circuit through an emergency electro-magnetic controlling valve device 8 comprising poppet valves 11 and 12, electro-magnetic valve device 5, contact 6 and battery 7.

The electro-magnetic valve device 5 comprises an electro-magnet adapted to operate poppet valves 9 and 10. The valve chamber containing valve 10 is open to the atmosphere, and the valve chamber containing valve 9 is open to a pipe 15 which leads to the driver's brake valve device and which in the running position of the driver's brake valve is supplied with fluid under pressure.

A valve chamber 13, intermediate the valves 9 and 10, is connected through a conduit 14 with a distributing valve device 16, and when the magnet is not energized, the valve 9 will be seated and the valve 10 unseated, so that fluid is vented from the piston 17 of the valve device 16 through conduit 14 and chamber 13 past the open valve 10 to the atmosphere. When the magnet is energized, the valve 10 is seated and the valve 9 is unseated, so that fluid under pressure is supplied from conduit 15 and the valve chamber of the valve 9, past the open valve 9 to chamber 13 and thence through conduit 14 to the distributing valve device 16.

The distributing valve device 16 comprises a body portion in which a piston 17 is mounted subject on one side to the pressure of fluid supplied from the chamber 13 through conduit 14 and of a spring 18 on the one side and of fluid supplied from the driver's brake device through a conduit 19 on the other side.

The piston 17 controls a slide valve 20 adapted to permit communication between the train pipe 21 and the driver's brake valve through conduits 15 and 19 or with the atmosphere through a conduit 22 and the pressure limiter 23 which comprises a body portion divided into two chambers by a piston 24. The upper chamber is adapted to be placed in communication through the poppet valves 11 and 12, either with the driver's brake valve or with the atmosphere, the lower chamber being normally in communication with the atmosphere through port 25. A spring 26 in the lower chamber is of such a strength as to permit the port 25 to be closed by a slide valve 27 controlled by the piston 24 upon a given fall of pressure in the lower chamber.

A port 29 in the slide valve 20 of the distributing valve device 16 is adapted to establish communication between the reservoir 28 and the driver's brake valve device through conduits 15, 19 and 30, poppet valve 31 and conduit 32, or between the reservoir 28 and the atmosphere through conduits 32 and 30, a recess in the slide valve and the port 33.

The reservoir 28 is, in permanent communication through a conduit 34 with a governing device adapted to actuate the contact device 4.

The apparatus illustrated in Figure 1 operates as follows.

Normally the electro-magnet valve device 5 is not energized and therefore the poppet valve 9 is closed and the poppet valve 10 is open with the result that the upper side of the piston 17 is in communication with the atmosphere past the poppet valve 10. The piston 17 is therefore moved upwards against the action of the spring 18 by fluid under pressure supplied from the driver's brake valve through conduit 19 with the result that the train pipe 21 is charged and the brakes released.

The slide valve 20 in its upper position also establishes communication between the reservoir 28 and the atmosphere through conduits 32—30—33, with the result that the contact device 4 of the governing device is closed.

Moreover the electro-magnetic valve device 8 is not energized and the poppet valve 11 is open and fluid under pressure is supplied through the driver's brake valve to the upper side of the piston 24 of the pressure limiting device 23.

*Intermittent-application of automatic brakes upon a predetermined speed being exceeded.*—When a predetermined speed is exceeded the needle 1, closes the circuit of the electro-magnetic valve device 5 through needle 1, contact 2, resistance 3, contact device 4, electro-magnetic valve device 5, contact 6 of the driver's brake valve and battery 7, with the result that the poppet valve 9 is opened and poppet valve 10 is closed.

Fluid under pressure is thereupon supplied to the distributing valve device 16 and the piston 17 is moved downwardly so that the slide valve 20 first cuts off the supply of fluid under pressure to the train pipe 21, and places it in communication with the atmosphere through conduit 22 and pressure limiter 23, and then places the reservoir 28 in communication with the driver's brake valve through conduits 15 and 19, port 29 and conduits 30 and 32 and past valve 31.

The train pipe 21 is therefore vented to atmosphere and when the pressure of the fluid therein attains a predetermined value, the pressure of the air obtaining in the conduit 15 moves the piston 24 downwardly and the slide valve 27 closes the port 25 so that fluid under pressure is no longer vented from the train pipe.

At the end of a predetermined period of time, the reservoir 28 is filled to a pressure for which the governing device of the contact device 4 is regulated, with the result that the contact 4 is opened, and the electro-magnetic valve device 5 becomes denergized and piston 17 reascends whereupon the train pipe 21 is recharged.

The to and fro movement will continue until the speed diminishes below the predetermined value, whereupon, the needle 1 breaks contact at 2.

The degree to which the brake pipe pressure is reduced depends upon the time the slide valve 27 remains open and this time may be regulated as desired by varying the strength of the spring 26.

The period of time in which the brakes remain applied depends on the time required to charge the timing reservoir 28 to the predetermined pressure at which the governing device of the switch 4 acts to open the switch, which in turn depends upon the flow area of conduit 32 and the flow area of the passage controlled by the check valve 31. The peroid of time in which recharging of the brake pipe and the release of the brakes takes place depends upon the time required to reduce the pressure in the reservoir 28 to a predetermined degree, which in turn depends on the rate of discharge from the reservoir by way of the conduit 32, the check valve 31 preventing back flow from the reservoir through the passage controlled by said check valve.

*Emergency braking.*—If, in spite of the automatic alternate application and release of the brakes described above the speed of the train continues to increase beyond a value considered dangerous, an automatic continuous application of the brakes takes place.

In this case the needle 1 closes, through the contact 2₁ the circuit 1, 2, electro-magnetic valve device 8, electro-magnetic valve device 5, contact 6, and battery 7.

The electro-magnetic valve device 8 is then energized and the poppet valve 11 closed, and the poppet valve 12 is opened.

As the electro-magnetic valve device 5 is also energized, poppet valve 9 is open and poppet valve 10 closed so that the piston 17 descends and vents the train pipe 21 through the slide valve 20, but the fall in pressure in the train pipe is no longer limited, as the upper side of the piston of 24 of the pressure limiting device 23 is now subject to atmospheric pressure past the poppet valve 12.

The contact 4 of the regulator is no longer in the energizing circuit of the electro-magnetic valve device 8 so that the brakes are applied continuously until released manually by means of the driver's brake valve.

Referring now to Figures 2, 3, 4 and 5 it will be observed that the braking apparatus illustrated in Figure 2 is similar to that illustrated in Figure 1 but that the automatic electro-magnetic controlling apparatus is replaced by automatic mechanical controlling apparatus.

Here again when the speed of the train attains a predetermined value, a distributing valve device is arranged to cut off the train pipe from the driver's brake valve and permit the escape of fluid under pressure therefrom to atmosphere. The escape of fluid under pressure from the train pipe is interrupted automatically as soon as a predetermined pressure is attained in the train pipe and therefore at the end of a predetermined period of time the application of the brakes ceases, the distributing valve device being then reversed and the brakes released and the train pipe recharged at the same time.

Referring to Figure 2 it will be observed that a centrifugal governor 41 is provided with a bell crank lever 42 controlled by the governor and arranged to actuate a regulating cam element adapted to control the poppet valves 9, 10, 11 and 12 of the valve devices 44 and 45 respectively. The valve devices 44 and 45 correspond respectively to the valve devices 5 and 8 in Figure 1 and are arranged to perform similar functions to those performed by the latter valve devices.

A vigilance valve device 46 actuated by means of the handle of the driver's brake valve in the running position thereof permits the supply of fluid under pressure to the valve devices 44 and 45 from the driver's brake valve only in the running position thereof.

A cam element 47 adapted to be controlled by a governing device 48 in communication with the reservoir 28 is provided for controlling the valve device 44, and as regards the other portions of the apparatus, these have already been described with reference to Figure 1 and are designated by the same reference numerals in Figures 1 and 2.

The operation of the apparatus illustrated in Figure 2 is as follows:—

Normally, that is to say when the train is travelling at a speed less than the predetermined speed the cam element 43 is in its extreme position towards the left as illustrated in Figure 2 and the poppet valve 10 is therefore open and the poppet valve 9 closed so that chamber on the upper side of the piston 17 of the distributing valve device 16 is vented to the atmosphere and the train pipe is supplied with fluid under pressure.

The reservoir 28 is also in communication with the atmosphere and the piston of the governing device 48 is in its extreme position towards the right.

The poppet valve 12 of the valve device 45 is closed and the poppet valve 11 is open and admits fluid under pressure from the driver's brake valve to the chamber on the upper side of piston 24.

*Intermittent application of the brakes (Figures 2 and 3).*—When the speed attains a predetermined value the centrifugal governor 41 causes the cam element 43 to move towards the right, and permits the poppet valve 10 of the valve 44 to close thus admitting fluid under pressure to the chamber on the upper side of the piston 17, which therefore descends and moves the slide valve 20 to cut off the train pipe 21 from the driver's brake valve and to vent it through conduit 22 and port 25.

Upon a predetermined fall of train pipe pressure taking place the piston 24 is moved downwardly by fluid under pressure supplied from the driver's brake valve past the poppet valve 11 and the slide valve 27 closes the port 25.

During this time, fluid under pressure supplied through the driver's brake valve device fills the reservoir 28, through the port 29 and conduit 32 and past valve 31 and at the end of a predetermined period of time the pressure in this reservoir attains such a value that the piston of the governing device 48 is moved towards the left, so that the cam element 47 opens the poppet valve 10 of the valve device 44 and thus causes the reversal of the distributing valve device and its slide valve 20 and permits the recharging of the train pipe (Figure 4).

A to and fro motion of the piston 17 is therefore established as was the case in the apparatus described with reference to Figure 1.

*Emergency braking (Figure 5).*—When a speed of dangerously high value is attained by the train the apparatus automatically effects a continuous application of the brakes. In this case the cam element 43 is at the extreme position towards the right and engages with the cam element 47 which is connected resiliently to the piston of the governing device 48, and the operation of the governing device 48 thus has no effect on the braking that is to say the brakes are not intermittently released.

The poppet valve 12 of the valve device 45 is opened by the cam element 43 and the chamber at the upper side of the piston 24 is connected to atmosphere past the valve 12 thus leaving the train pipe 21 permanently connected to atmosphere through conduit 22 and port 25.

The vigilance valve device 46 in any position of the driver's brake valve other than the running position prevents the admission of fluid under pressure to the valve devices 44 and 45 and thus to the distributing valve device so that an automatic intermittent or emergency application of the brakes cannot take place.

It will be evident that the invention is not limited to the particular construction and arrangement of parts hereinabove described which may be varied as desired to suit particular requirements without exceeding the scope of the invention.

Having now described my invention what I claim as new and desire to secure by Letters Patent, is:—

1. In fluid pressure braking apparatus for a vehicle, means for automatically effecting an intermittent application of the brakes which intermittent application is initiated when the vehicle attains a predetermined speed.

2. In fluid pressure braking apparatus for a vehicle, means for automatically effecting an intermittent application of the brakes when the vehicle attains a predetermined speed and means for superseding the intermittent application of the brakes and automatically effecting a continuous application of the brakes when the vehicle attains a predetermined greater speed.

3. In fluid pressure braking apparatus for a vehicle, means for automatically effecting an intermittent application of the brakes when the vehicle attains a predetermined speed and for continuing said intermittent application until the vehicle speed is reduced to a predetermined degree.

4. In fluid pressure braking apparatus for a vehicle, means for automatically effecting an intermittent application of the brakes when the vehicle attains a predetermined speed means for superseding the intermittent application of the brakes and automatically effecting a continuous application of the brakes and manually operable means for superseding the automatic application of the brakes.

5. In fluid pressure braking apparatus for a vehicle, electrically controlled means for automatically effecting an intermittent application of the brakes and means for starting said intermittent application when the vehicle attains a predetermined speed.

6. In fluid pressure braking apparatus for a vehicle, the combination of a brake pipe, a distributing valve device for controlling the supply of fluid to and its release from said brake pipe and automatic means for moving said distributing valve device alternately to its application and release positions.

7. In fluid pressure braking apparatus for a vehicle, the combination of a distributing valve device, an electro-magnetic valve device for controlling said distributing valve device and means for intermittently energizing said electro-magnetic valve device when the vehicle attains a predetermined speed.

8. In fluid pressure braking apparatus for a vehicle, the combination of a brake pipe, automatic means for intermittently venting fluid under pressure from the brake pipe when the vehicle attains a predetermined speed and means for limiting the fall of pressure in the brake pipe upon each application of the brakes.

9. In fluid pressure braking apparatus for a vehicle, the combination of a brake pipe, automatic means for intermittently venting fluid under pressure from the brake pipe when the vehicle attains a predetermined speed, a pressure limiting device for automatically limiting the fall of pressure in the brake pipe upon each application of the brakes and means for automatically rendering the pressure limiting device inoperative when the vehicle attains a predetermined speed.

10. In fluid pressure braking apparatus for a vehicle, the combination of a distributing valve device, an electro-magnetic valve device for controlling said distributing valve device, a reservoir for controlling a contact device for controlling said electro-magnetic valve device, means for charging said reservoir during application of the brakes, and means for venting said reservoir during release of the brakes.

11. In fluid pressure braking apparatus for a vehicle, the combination of a distributing valve device, electro-magnetic means for intermittently supplying fluid under pressure to said distributing valve device and means for rendering said electro-magnetic means continuously energized.

In testimony whereof I have hereunto set my hand.

ERNEST FELIX WAGNER.